(12) United States Patent
Takano et al.

(10) Patent No.: US 7,673,931 B2
(45) Date of Patent: Mar. 9, 2010

(54) WORKING VEHICLE

(75) Inventors: Yoshiyuki Takano, Kawagoe (JP); Takeshi Endo, Kawagoe (JP)

(73) Assignee: Komatsu Ltd., Tokyo (JP)

( * ) Notice: Subject to any disclaimer, the term of this patent is extended or adjusted under 35 U.S.C. 154(b) by 320 days.

(21) Appl. No.: 11/629,007

(22) PCT Filed: Jun. 2, 2005

(86) PCT No.: PCT/JP2005/010119

§ 371 (c)(1),
(2), (4) Date: Dec. 8, 2006

(87) PCT Pub. No.: WO2005/121461

PCT Pub. Date: Dec. 22, 2005

(65) Prior Publication Data

US 2008/0265624 A1    Oct. 30, 2008

(30) Foreign Application Priority Data

Jun. 9, 2004    (JP)    ............................ 2004-170978

(51) Int. Cl.
*B62D 33/067* (2006.01)
(52) U.S. Cl. ............................ 296/190.01; 296/190.05; 180/89.14
(58) Field of Classification Search ............ 296/190.01, 296/190.03, 190.04, 190.05, 190.08, 190.11; 180/89.14, 89.16, 89.18
See application file for complete search history.

(56) References Cited

U.S. PATENT DOCUMENTS 4,040,501 A * 8/1977 Haswell .................. 180/89.18
4,221,274 A * 9/1980 Martin, Jr. .................. 180/69.2
4,311,205 A * 1/1982 Goodacre et al. .......... 180/68.5
D354,497 S    1/1995 Kusunoki et al.

(Continued)

FOREIGN PATENT DOCUMENTS

EP    1 413 684    4/2004

(Continued)

OTHER PUBLICATIONS

Melroe Company, Bobcat Parts Manual, Model 56 Hydraulic Excavator, 3 pages.

*Primary Examiner*—Glenn Dayoan
*Assistant Examiner*—Gregory Blankenship
(74) *Attorney, Agent, or Firm*—Fish & Richardson P.C.

(57) ABSTRACT

The invention relates to a working vehicle which can improve a workability of a maintenance, inspection and the like with respect to a portion around an engine, and can tilt up a rear hood together with a tilt-up floor. An upper side of an engine (not shown) can be covered in a rear end portion side of a floor (35). A hinge mechanism (38) is arranged between a front end portion of the floor (35) and a rev-frame (25), and the floor (35) can be tilted up via the hinge mechanism (38). A rear hood (32) is coupled by hinge to a first support column (15) of a mounting bracket (4) supporting the floor (35), and is structured so as to be freely opened and closed. It is possible to tilt up the floor (35) in a state of attaching the rear hood (32), by canceling a fixed state of the mounting bracket (4) to a supporting and fixing member such as a counter weight (2) or the like.

13 Claims, 10 Drawing Sheets

U.S. PATENT DOCUMENTS

| | | |
|---|---|---|
| 6,279,978 B1 | 8/2001 | Schreyer et al. |
| 6,322,133 B1 | 11/2001 | Yantek et al. |
| 6,357,820 B1 * | 3/2002 | Nagatsuka et al. ..... 296/190.06 |
| 6,729,431 B2 | 5/2004 | Osuga et al. |
| 7,131,687 B2 | 11/2006 | Yokoo et al. |
| 7,213,871 B2 * | 5/2007 | Yamamoto ............ 296/190.03 |
| 7,246,846 B2 | 7/2007 | Shioji et al. |
| 7,287,810 B2 * | 10/2007 | Ishii et al. ............. 296/190.05 |
| 7,320,380 B2 * | 1/2008 | Ueda et al. ................. 180/327 |
| 7,338,114 B2 * | 3/2008 | Ishii et al. ............. 296/190.05 |
| 7,396,070 B2 * | 7/2008 | Albright ............... 296/190.05 |
| 2003/0010563 A1 | 1/2003 | Osuga et al. |
| 2004/0084934 A1 | 5/2004 | Yokoo et al. |
| 2006/0186703 A1 * | 8/2006 | Yamamoto ............ 296/190.03 |
| 2007/0069551 A1 * | 3/2007 | Hiraoka ................ 296/190.03 |
| 2008/0067836 A1 | 3/2008 | Takano et al. |

FOREIGN PATENT DOCUMENTS

| | | |
|---|---|---|
| JP | 5-64231 | 8/1993 |
| JP | 10-331195 | 12/1998 |
| JP | 2001-063638 | 3/2001 |
| JP | 2003-221841 | 8/2003 |
| JP | 2004-142730 | 5/2004 |
| JP | 2004-156334 | 6/2004 |
| JP | 2004-197550 | 7/2004 |
| WO | WO2004/076265 | 9/2004 |

* cited by examiner

WORKING VEHICLE

TECHNICAL FIELD

The present invention relates to a working vehicle having a working machine, a driver seat and the like and in which a main machine provided with a counter weight with respect to the working machine is provided on a lower traveling body, and more particularly to a working vehicle in which a floor of the main machine is structured as a tilt floor.

BACKGROUND ART

As a working vehicle provided with a working machine and a counter weight with respect to the working machine, there has been conventionally employed, for example, a working vehicle equipped with a working machine such as an excavating work apparatus or the like. In these working vehicle, in order to easily execute an operation such as a maintenance, an inspection and the like around an engine, there has been employed a structure for tilting up a floor, as a structure for securing a working space around the engine.

As the working vehicle capable of tilting up the floor, for example, as described in Japanese Patent Application Laid-Open No. 2003-221841 (patent document 1), there is a construction machine which can execute a high lift work such as a dismantling, an excavation or the like at a high lift work position in an upper side from the ground under the same condition and feeling as those of an operation control of an operator in a normal work in a forward and downward direction. For example, as proposed in Japanese Patent Application No. 2003-51902 (patent document 2) in accordance with the applicant of the present invention, there is a rear end small revolving hydraulic shovel or the like which can tilt up a driver seat floor attached to a canopy.

In the invention described in the patent document 1, as shown in FIG. 10, a driver's cabin 52 is mounted on a driver's cabin lower frame 53, and the driver's cabin lower frame 53 is rotatably pivoted to a support member 55 provided in a rising manner in a main frame 51 of a revolving body 50. The structure is made such that the driver's cabin 52 can be tilted from a horizontal state to a tilt position ascending to a front side, on the basis of an expansion and contraction of the hydraulic cylinder 54.

Accordingly, an operator can operate an operation lever or the like in a state in which the driver's cabin 52 is ascended to the front side and the operator reclines to a back side of the driver seat. In other words, it is possible to set a sitting attitude of the operator to a sitting attitude that the operator reclines to the back side and a diagonally upper side corresponds to a forward side. Accordingly, it is possible to arrange a layout position of the operation lever or the like in the high lift work at the same layout position as a layout position of the operation lever or the like with respect to the operator in the normal forward work, and it is possible to operate the operation lever or the like under the same feeling as that of the normal forward work.

Further, in the invention of the patent document 2, as shown in FIG. 11, a revolving frame 61 is provided in a bottom portion in an upper revolving body 60, and a working machine 63 attached to a front portion of the revolving frame 61 via a swing bracket 62 attached so as to freely swing right and left in such a manner as to freely oscillate up and down. In order to balance with the working machine 63, a counter weight 65 is arranged in a rear end portion in a rear portion of the revolving frame 61, and an engine 66 is arranged near a front side of the counter weight 65.

A frame 67 is provided in a rising manner in an upper portion of the revolving frame 61 near the engine 66, and each of a side surface partition wall 68 of the engine 66 and a rear portion inspection cover 69 is attached to the frame 67. The rear portion inspection cover 69 can rotate upward around a hinge portion attached to the frame 67, and can make a portion around the engine open by being rotated upward.

An operator seat 70 is arranged at a position close to a front side in an upper side of the engine 66, and the operator seat 70 is supported by a floor frame 72. An operation lever 71 is arranged in a front portion of the floor frame 72. A driver seat is constituted by the operator seat 70, the floor frame 72 and the operation lever 71.

A pair of brackets 73 are attached to right and left sides of a lower portion in a front side of the floor frame 72, and are rotatably coupled to a bracket 64 provided in a front portion of the revolving frame 61 by a pin 74. A flange portion 75 attached to a rear end portion of the floor frame 72 is detachably fastened to the frame 67 by a bolt (not shown). As a consequence, it is possible to tilt up the floor frame 72 around a pin 74 as a supporting point while detaching the bolt from a fastened state to the flange portion 75, and it is possible to make a working space around the engine open.

Patent Document 1: Japanese Patent Application Laid-Open No. 2003-221841

Patent Document 2: Japanese Patent Application No. 2003-51902

DISCLOSURE OF THE INVENTION

Problem to be Solved by the Invention

In a construction machine shown in the patent document 1, the structure is made such that the driver's cabin 52 can be tilted in correspondence to an angle of gradient suitable for the high lift work. However, the structure is not made such that the driver's cabin 52 is tilted for executing inspection and repair around the engine. It is possible to execute the work such as the maintenance and inspection around the engine or the like in a state in which the driver's cabin 52 is tilted to the angle of gradient suitable for the high lift work. However, there is a problem that since the working machine is arranged in the front side of the driver's cabin 52, an access around the engine is achieved only from the side portion of the construction machine.

Further, even if it is intended to access to the portion around the engine from the side portion, the hydraulic cylinder 54 tilting the driver's cabin 52 forms an obstacle so as to obstruct the access to the portion around the engine. Further, in the case that the layout position of the engine is arranged below the seat of the driver seat 52, the structure is made such that the portion around the engine can not be open wide, so that there is a problem that it is hard to execute the maintenance and inspection work with respect to the engine or the like.

In a rear end small revolving hydraulic shovel shown in the patent document 1, it is possible to tilt up the floor frame 72 around the pin 74 corresponding to the supporting point while detaching the bolt from the fastening state to the flange portion 75, and it is possible to make the working space around the engine 66 open. Further, it is possible to rotate the rear inspection cover 69 to the upper side by being rotated to the upper side around the hinge portion attached to the flame 67, and it is possible to make the portion around the engine 66 widely open. Accordingly, it is possible to sufficiently secure the access to the portion around the engine.

However, when executing the maintenance and inspection around the engine from the rear portion of the working vehicle in a state in which the rear inspection cover 69 is open, it is necessary to execute the inspection and repair work or the like by putting a head or a hand in the rear inspection cover 69.

An object of the present invention is to provide a working vehicle which can improve a workability of a maintenance and inspection with respect to a portion around an engine, can firmly support and fix a tilt-up floor in a normal use state, and can tilt up a cab or a canopy together with the tilt-up floor.

Means for Solving the Problem

The object of the present invention can be effectively achieved by the following working vehicle. In other word, according to the present invention, there is provided a working vehicle, in which a main machine having a working machine corresponding to a basic structure of the present invention, a driver seat and the like is mounted on a lower traveling body; and a counter weight balancing with the working machine is arranged in a rear portion of the main machine, the working vehicle being characterized in that: a floor constituting a floor portion of the main machine is structured such that the floor can be tilted up; and a rear hood in the main machine is arranged such that the rear hood can be tilted up integrally with the floor when the floor is tilted up.

Further, according to a preferable embodiment of the present invention, the rear hood is an openable and closable inspection door.

Further, according to the present invention, it is preferable that the working vehicle is provided with a mounting bracket detachably supported and fixed by constituting members of the working vehicle, the mounting bracket has a first mounting seat plate detachably supporting and fixing a rear end portion of the floor, and at least one first support column supporting and fixing a center in a lower surface side of the first mounting seat plate while opening, and the first support column or the first mounting seat plate attaches a hinge portion of the inspection door.

Furthermore, according to the present invention, it is desirable that the working vehicle is provided with a cab or a canopy, and the cab or the canopy is arranged such that the cab and the canopy can be tilted up integrally with the floor when the floor is tilted up.

Effect of the Invention

According to the present invention, in the working vehicle having the floor which can be tilted up, the rear hood in the main machine is arranged so as to integrally tilt up together with the floor at a time of tilting up the floor.

Accordingly, it is possible to widely enlarge the working space around the engine or within a rev-frame, and it is possible to easily execute the maintenance and inspection work or the like around the engine or within the rev-frame. Further, since any extra material forming an obstacle does not exist in a rising manner at a time of maintaining and inspecting around the engine or within the rev-frame, it is possible to detach the engine or the like, and it is possible to widely improve a workability in the maintenance, the inspection or the like.

As already mentioned as the preferable aspect, in the case that the rear hood is constituted by the openable inspection door, it is possible to execute the maintenance, the inspection and the like around the engine by opening the inspection door even in the state in which the floor is not tilted up. Further, since the inspection door can be tilted up together with the floor in the state in which the floor is tilted up, it is possible to smoothly and easily execute the work such as the maintenance, the inspection and the like around the engine or within the rev-frame.

Furthermore, it is possible to detachably support and fix the rear end portion of the floor by the first mounting seat plate of the mounting bracket detachably supported and fixed by the constituting member of the working vehicle. At least one first support column supporting and fixing the center in the lower surface side of the first mounting seat plate while being open may be provided as the constituting member of the mounting bracket.

Moreover, it is possible to attach the hinge portion of the inspection door to the first support column or the first mounting seat plate, and the inspection door may be structured as an inspection door open to an upper side, or may be used as a single swing or double hinged inspection door around the first support column side corresponding to a center of rotation. In this case, the center in the lower surface side of the first mounting seat plate is open. For this reason, it is possible to execute the work such as the maintenance, the inspection and the like around the engine via the opening, at a time of opening the inspection door.

The first column support can be tilted up integrally together with the floor. A mounting seat or the like can be formed in the other end portion of the first support column, that is, an opposite end portion to the first mounting seat plate side. It is possible to detachably support and fix the first support column to the counter weight or the rev-frame via the mounting seat or the like. When tilting up the floor, it is possible to tilt up the first support column together with the floor, by detaching the attached state to the counter weight or the rev-frame.

The first mounting seat plate can be supported and fixed by attaching at least a pair of first support columns to portions near both end portions of the first mounting seat plate. A pair of first support columns can be detachably supported and fixed to the counter weight and the rev-frame. It is possible to prevent or damp a transmission of a vibration of the engine or the like via the mounting bracket, by interposing a vibration proofing member such as a vibration proofing rubber or the like in a contact portion between the first mounting seat plate and the floor, and supporting and fixing the floor to the first mounting seat plate.

Further, the structure may be made such that the portion near one end portion of the first mounting seat plate is supported and fixed by the first support column, and the other end portion is detachably supported and fixed by utilizing a radiator bracket attached to the rev-frame, an engine bracket, an armored bracket or the like. Particularly, in the case of utilizing the radiator bracket, the engine bracket or the armored bracket as the member supporting the first mounting seat plate. Consequently, it is possible to simplify a structure shape of the mounting bracket, and it is possible to reduce a weight of the mounting bracket.

The mounting bracket can be structured by a sheet metal or the like, and can be structured by reducing the weight of the mounting bracket. Accordingly, the weight does not obstruct the tilt-up of the floor, and it is possible to easily tilt up the floor.

Particularly, a sheet metal shape in the first support column can be formed in an L-shaped cross sectional shape having a strength, a C-shaped cross sectional shape, a rectangular cross sectional shape, a triangular cross sectional shape and the like. As a consequence, it is possible to set the strength of the mounting bracket to a strength sufficiently supporting the floor. The strength as the mounting bracket can be provided with a sufficient strength for supporting the floor.

Even in the working vehicle provided with the cab or the canopy, it is possible to integrally tilt up the cab or the canopy equipped at a time of tilting up the floor together with the floor.

The sufficient strength for supporting the floor can be provided as the strength of the mounting bracket, and it is possible to structure in such a strength as to satisfy a safety standard capable of standing against the vehicle weight at a time when the working vehicle is inverted and supporting and fixing the cab or the canopy, even in the case that a part of the cab or the canopy is supported and fixed by the mounting bracket.

The canopy may be structured such as to form a second mounting seat plate firmly attached between lower end portions of a pair of right and left second support columns supporting a roof, and detachably support and fix the second mounting seat plate by utilizing the first mounting seat plate in the mounting bracket.

Figure 1:
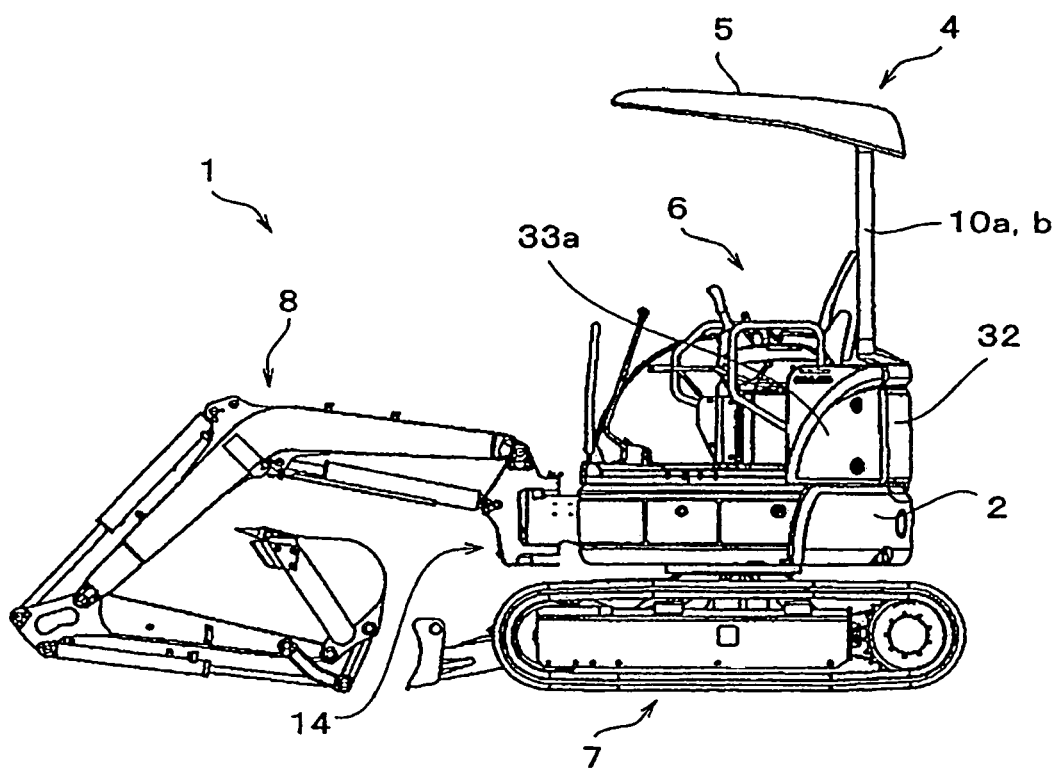
FIG. 1 It is a schematic side elevational view of a working vehicle according to an embodiment of the present invention (first embodiment).

DESCRIPTION OF REFERENCE NUMERALS 1 working vehicle
2 counter weight
3 mounting bracket
4 canopy
6 driver seat
7 traveling body
8 working machine
9 armored cover
10a, b second support column
11 second mounting seat plate
15 first support column
16 first mounting seat plate
20 lower mounting seat
22 bracket
25 rev-frame
28 engine
30 opening
32 rear hood
33a, b side hood
35 floor
38 hinge mechanism
39 spring cylinder
40 torsion bar
41 lock plate
42 lock bar
43a long hole
43b lock groove
44 lock mechanism
45 cab
50 revolving body
51 main frame
52 driver's cab
53 driver's cab lower frame
54 hydraulic cylinder
55 support member
60 upper revolving body
61 revolving frame
65 counter weight
66 engine
68 side surface partition wall
69 rear inspection cover
72 floor frame
74 pin

BEST MODE FOR CARRYING OUT THE INVENTION

A description will be specifically given below of preferable embodiments according to the present invention with reference to the accompanying drawings. As a structure of a working vehicle according to the present invention, it is possible to employ every shapes and layout structures as far as the shapes and the layout structures can solve the problem of the present invention, in addition to shapes and layout structures described below. Accordingly, the present invention is not limited to the embodiments described below, but can be modified variously.

First Embodiment

Figure 2:
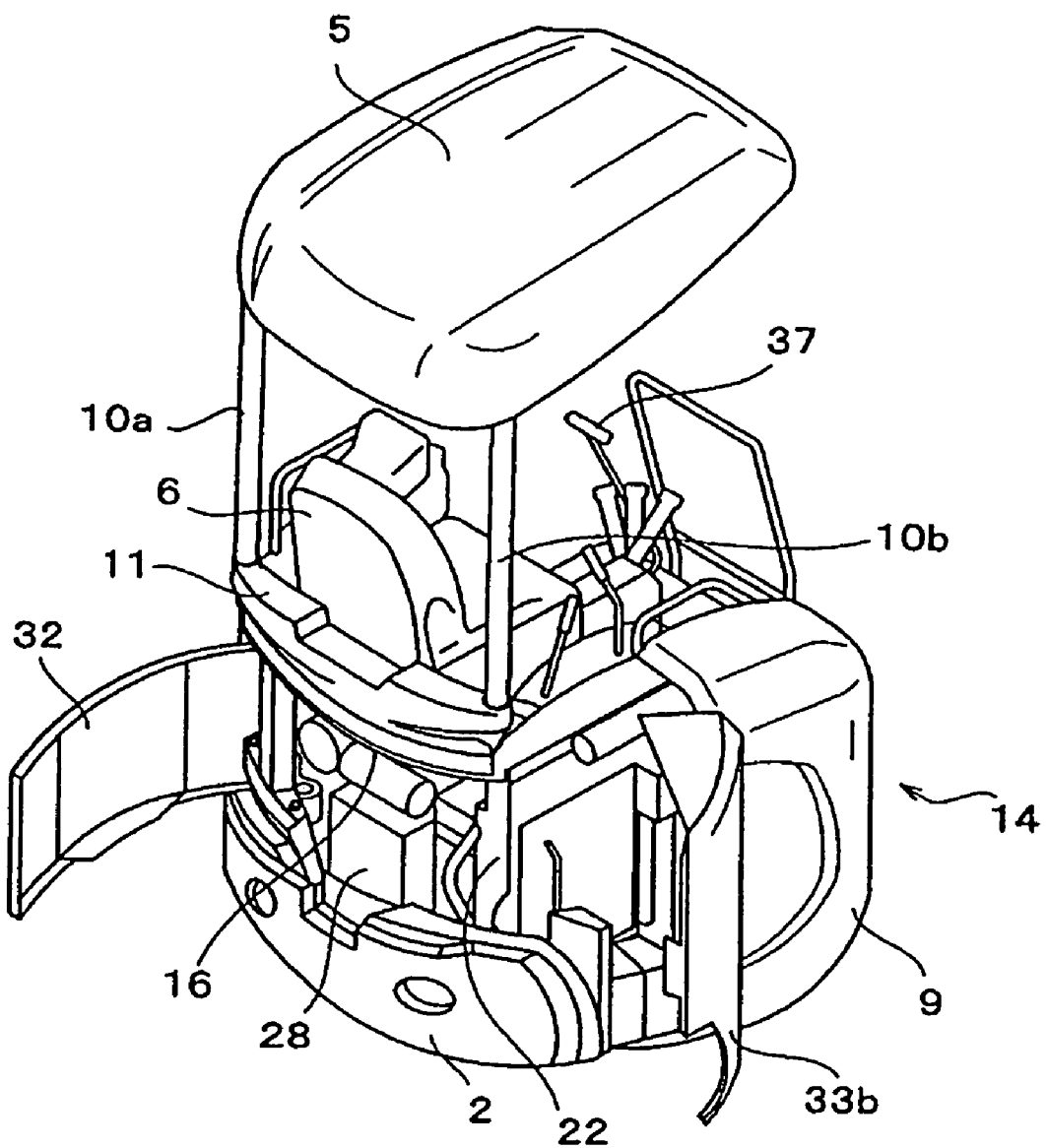
FIG. 2 It is a schematic perspective view as seen from a diagonally rear side of the working vehicle (first embodiment).
Figure 3:
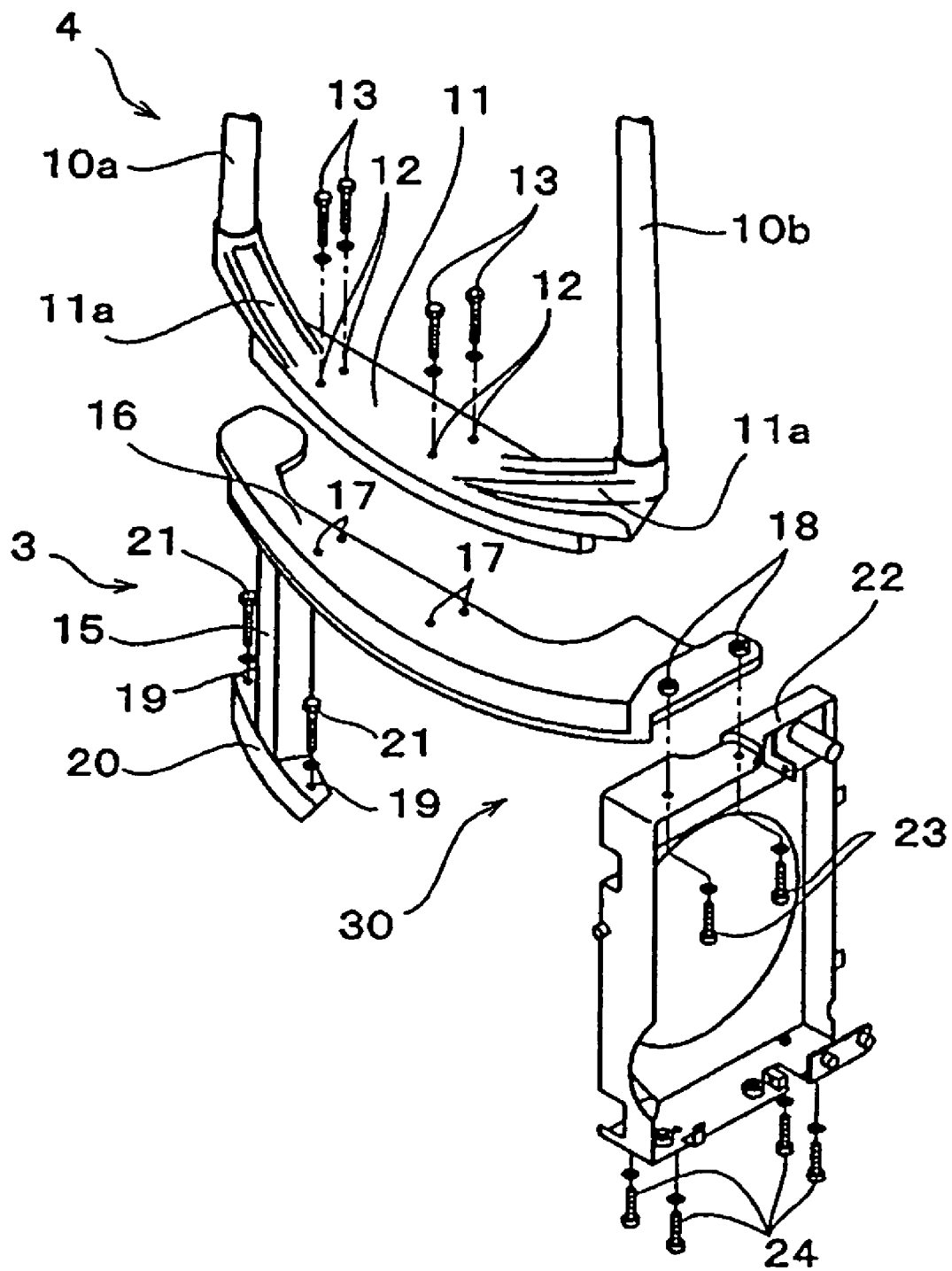
FIG. 3 It is an expansion perspective view showing structures of main portions of a canopy, a mounting bracket and a bracket (first embodiment).
Figure 4:
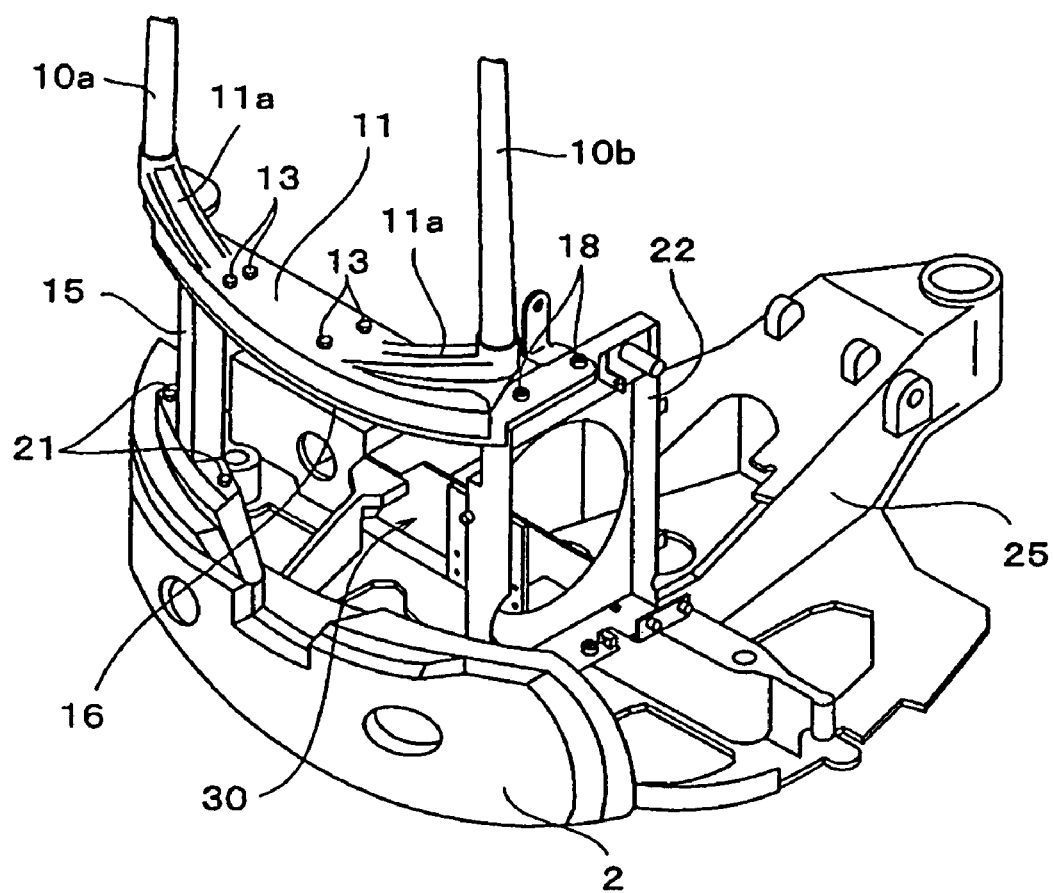
FIG. 4 It is a perspective view showing a state in which the respective members in FIG. 2 are supported and fixed to an assembly counter weight and a rev-frame (first embodiment).

FIG. 1 is a schematic side elevational view of a working vehicle according to an embodiment of the present invention. FIG. 2 is a schematic perspective view as seen from a diagonally rear side of the working vehicle. FIG. 3 is an expansion perspective view showing structures of main portions of a canopy, a mounting bracket and a bracket. FIG. 4 is a perspective view showing a state in which the respective members in FIG. 2 are supported and fixed to an assembly counter weight and a rev-frame.

Figure 5:
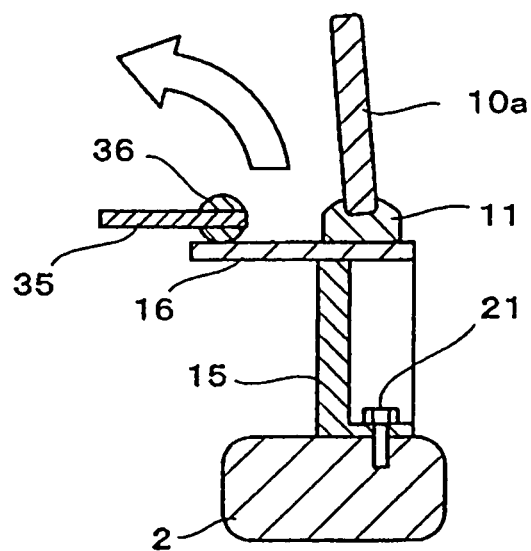
FIG. 5 It is a schematic cross sectional view showing a layout structure in one end side of a first mounting seat plate (first embodiment).
Figure 6:
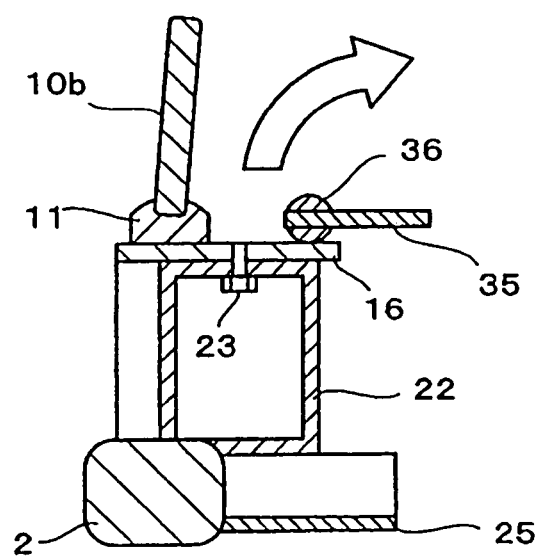
FIG. 6 It is a schematic cross sectional view showing a layout structure in the other end side of the first mounting seat plate (first embodiment).
Figure 7:
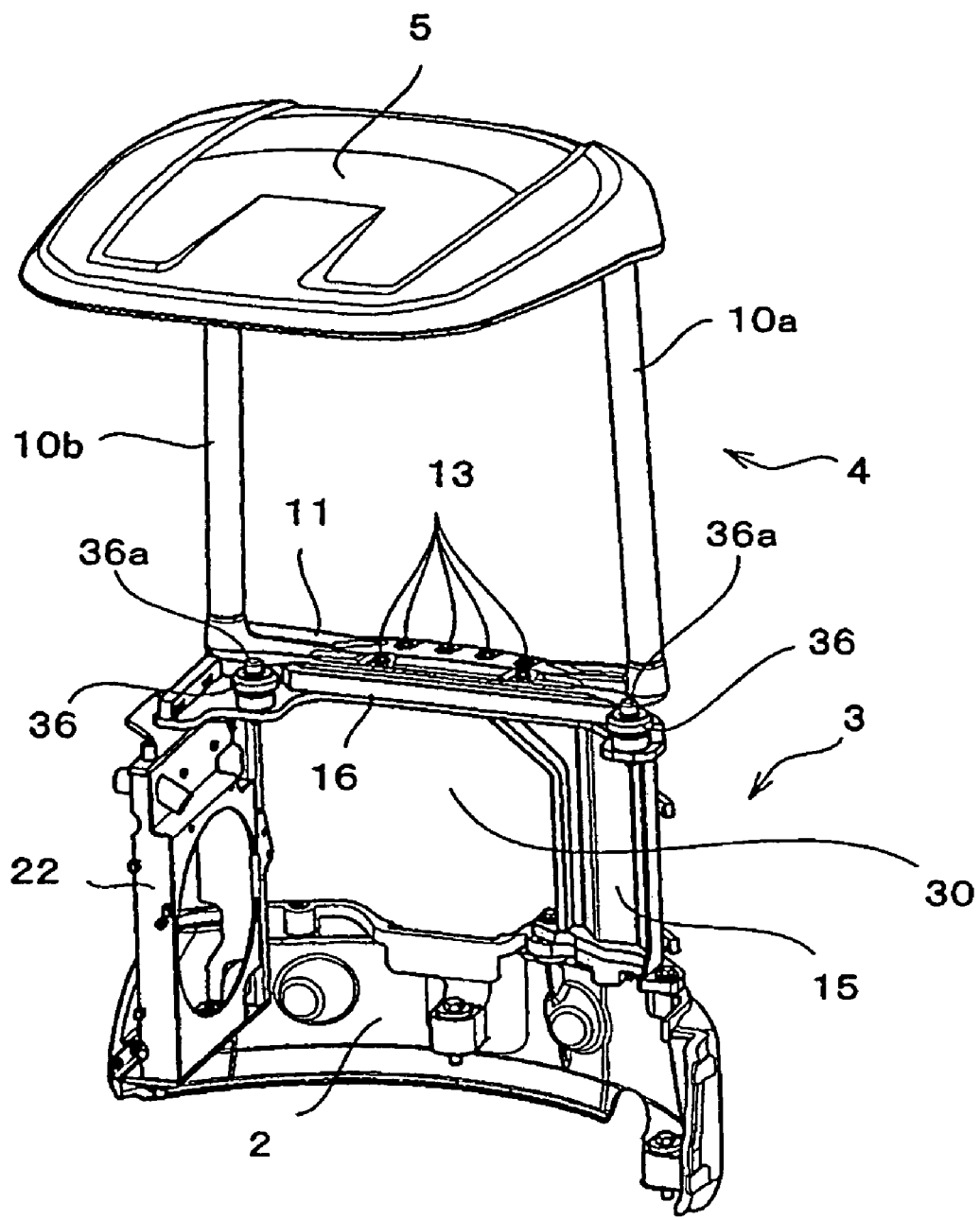
FIG. 7 It is a perspective view showing mounting structures of the canopy, the mounting bracket and the bracket (first embodiment).
Figure 8:
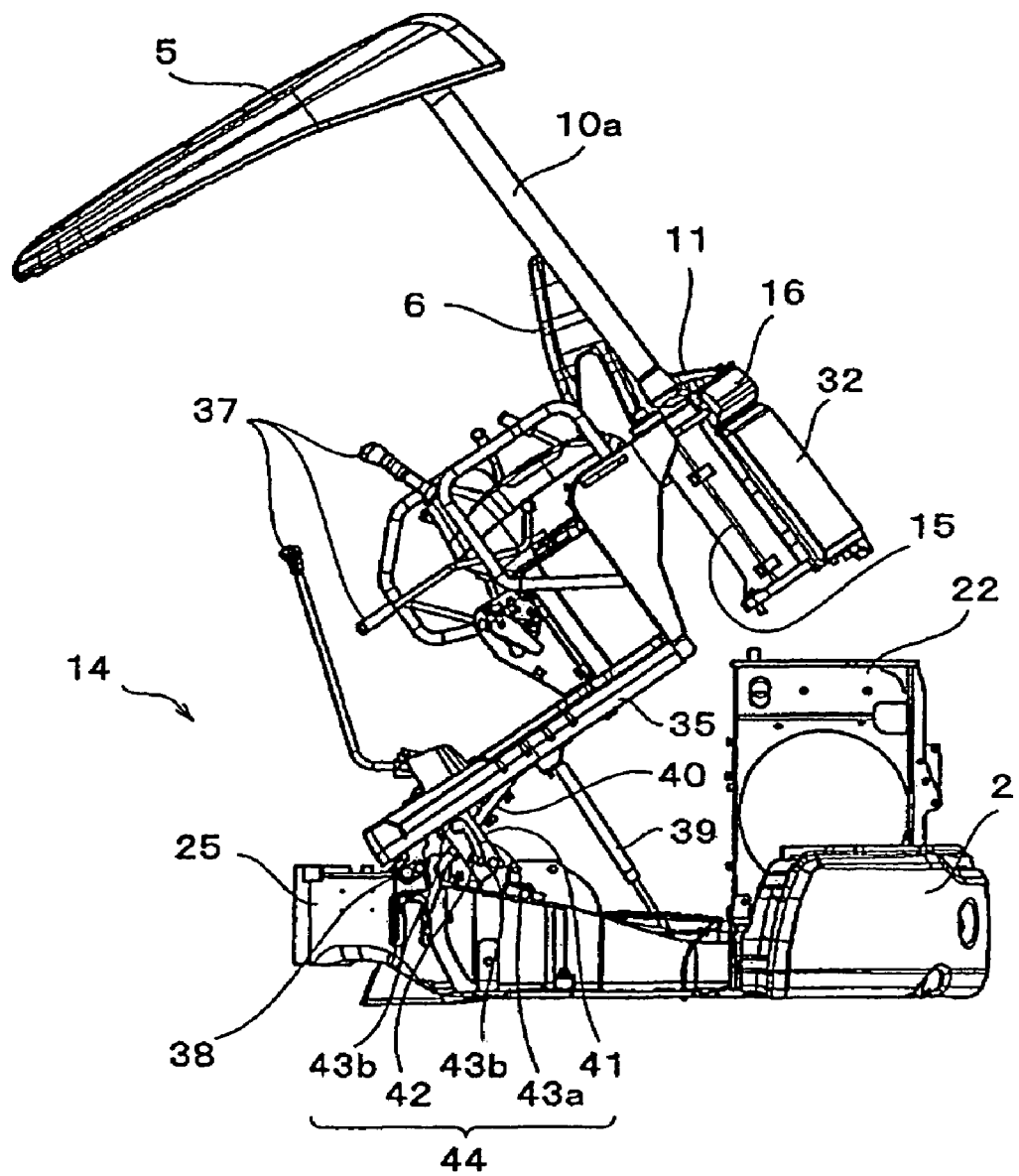
FIG. 8 It is a side elevational view showing a tilt-up state of a floor (first embodiment).

FIG. 5 is a schematic cross sectional view showing a layout structure between the canopy, the floor and the counter weight in one end side of a first mounting seat plate. FIG. 6 is a schematic cross sectional view showing a layout structure between the canopy, the floor and the counter weight in the other end side of the first mounting seat plate. FIG. 7 is a perspective view showing mounting structures of the canopy, the mounting bracket and the bracket. FIG. 8 is a side elevational view showing a tilt-up state of the floor.

In FIG. 1, there is shown an outer appearance of a compact excavation vehicle 1 corresponding to an example of a working vehicle according to the present invention. A main machine 14 constituted by a working machine 8, a driver seat 6, an engine, a counter weight 2 and the like is mounted on a pair of right and left traveling bodies 7 so as to freely swivel and rotate. A canopy 4 is provided in such a manner as to cover an upper portion, a rear portion and the like of the driver seat 6, and the structure is made such that a safety of a worker can be secured by the canopy 4 at a time when the working vehicle 1 is inverted.

The counter weight balancing with the working machine 8 is arranged in a rear portion of the main machine 14. A plurality of control levers 37 executing a control of the working machine 8 and a traveling control of the working vehicle 1 are arranged around the driver seat 6.

As shown in FIG. 2, the canopy 4 is supported and fixed by a pair of left and right second support columns 10a and 10b in such a manner as to support a roof 5 from a lower surface side. A pair of left and right second support columns 10a and 10b are bent approximately in an L shape in the middle after supporting the roof 5, and lower end portions of the second support columns 10a and 10b are coupled and firmly attached by a second mounting seat plate 11.

A side hood 33a shown in FIG. 1 is attached to the main machine 14 by bolts or the like, and can be detached from the main machine 14 or be rotated around one end portion of the side hood 33a in such a manner as to open an inner portion of the main machine 14, by detaching the bolts or the like.

As shown in FIG. 2, a rear hood 32 can be opened and closed in a single swing manner, and can access to an engine 28 arranged in an inner portion of the rear hood 32. The rear hood 32 is attached to a first support column 15 of the mounting bracket 3 via a hinge (not shown). Further, a side hood 33b is attached to an armored cover 9 via a hinge (not shown) in such a manner as to be openable in an inverse direction to an open direction of the rear hood 32.

The rear hood 32 is described about the structure opening and closing to right and left. However, the present invention is not limited to this structure. As the structure of the rear hood 32, the structure may be made such that the rear hood 32 is connected by hinge to a first mounting seat plate 16 or the second mounting seat plate 11 of the canopy 4 so as to be opened and closed in a vertical direction, or the structure may be made such that the rear hood 32 is double hinged and opened to right and left from a middle of the rear hood 32.

The rear hood 32 and the side hood 33b can be maintained in a closed state by a lock mechanism (not shown). It is also possible to execute a maintenance and inspection work around the engine arranged in an inner side of the rear hood 32, and a maintenance and inspection work within the rev-frame 25 by opening the rear hood 32 and the left and right side hoods 33a and 33b.

As shown in FIG. 3, a plurality of mounting holes 12 are pieced in the second mounting seat plate 11 of the canopy 4, and it is possible to firmly support and fix the second mounting seat plate 11 with respect to a mounting hole 17 of the first mounting seat plate 16 in the mounting bracket 3 via a mounting bolt 13.

Further, in order to relax a stress concentration in a coupled and firmly attached portion between the lower end portions of a pair of left and right second support columns 10a and 10b and the second mounting seat plate 11, it is possible to form a reinforcing rib 11a or the like in the second mounting seat plate 11 as well as forming a shape of the coupled and firmly fixed portion in a smooth coupled shape.

The mounting bracket 3 is constituted by a first support column 15 and the first mounting seat plate 16 in which a portion near one end portion is attached to the first support column 15. The mounting bracket 3 is structured by a sheet metal formed by bending a steel plate or the like, and a horizontal cross sectional shape of the first support column 15 is formed in the approximately L shape. A lower mounting seat 20 is formed in an opposite end portion to an end portion to which the first mounting seat plate 16 is attached in the first support column 15. The first support column 15 can be firmly supported and fixed to the constituting member of the working vehicle 1 by mounting bolts 21 via mounting holes 19 formed in the lower mounting seat 20.

The other end portion of the first mounting seat plate 16 can be firmly supported and fixed by a bracket 22 corresponding to the constituting member of the working vehicle 1, and can be structured as shown in FIG. 4. In an illustrated embodiment, there is shown the example in which the other end portion of the first mounting seat plate 16 is supported and fixed by using the bracket 22. However, as a supporting and fixing method in the other end portion of the first mounting seat plate 16, the method can be executed by using a support column provided with the same structure as the first support column 15 supporting and fixing one end portion side of the first mounting seat plate 16, in place of using the bracket 22. As a mounting method between the first support column 15 and the first mounting seat plate 16, the method can be executed by using welding means or attaching and fixed via an L-shaped reinforcing piece or the like.

As shown in FIG. 4, the first support column 15 in the mounting bracket 3 can be attached to a mounting seat formed in the counter weight 2 by using the mounting bolt 21. The other end portion side of the first mounting seat plate 16 can be attached to the bracket 22 attached to the rev-frame 25 by using mounting bolts 24. In this case, in FIG. 7, there is shown a perspective view of the mounting state shown in FIG. 4 in the case of viewing from a front surface side while omitting the rev-frame 25.

Accordingly, it is possible to form an opening 30 between a lower surface side of the first mounting seat plate 16 and the counter weight 2 and between the first support column 15 and the bracket 22 as shown in FIGS. 4 and 7, and it is possible to use the opening 30 as a maintenance and inspection port of an engine mounted in a front surface side of the mounting bracket 3. The opening can be structured such as to be freely opened and closed by the rear hood 32.

It is possible to support and fix the first mounting seat plate 16 to the counter weight 2 via the first support column 15, and it is possible to firmly support and fix by the bracket 22 attached to the rev-frame 25. As a consequence, it is possible to construct the mounting bracket 3 as a rectangular block body provided with a desired strength.

Furthermore, since the canopy 4 can be supported and fixed by the mounting bracket 3 having the desired strength, it is possible to structure the canopy 4 in such a manner as to satisfy a strength standard defined by ISO standard or the like. A pair of left and right second support columns 10a and 10b of the canopy can be formed by bending one support column, or can be formed by respectively bending two independent second support columns 10a and 10b.

At this time, a pair of left and right second support columns 10a and 10b may be formed by a hollow pipe or the like, or may be formed by a solid pipe or the like. As a pair of left and right second support columns 10a and 10b, it is necessary to have such a strength that the second support columns are not bent over a level deteriorating a safety of the worker working in the driver seat, on the basis of an impact force generated at a time when the working vehicle 1 is inverted or a weight of the working vehicle 12.

In this case, a pair of left and right second support columns 10a and 10b are structured such as to be bendable to a level which does not deteriorate the safety of the worker existing in the driver seat. For this reason, the structure can be made such as to absorb the impact applied to the canopy 4 at a time when the working vehicle is inverted.

As shown in FIGS. 5 and 6, a rear end portion of a floor 35 constituting a floor portion of the driver seat 6 can be supported and fixed to the first mounting seat plate 16 by bolts or the like via a vibration proofing rubber 36. In FIG. 7, there is shown a state before the floor 35 is attached to the first mounting seat plate 35. The rear end portion of the floor 35 can be supported and fixed to the first mounting seat plate 35 by inserting a bolt 36a to a mounting hole formed in the rear end portion of the floor 35 via the vibration proofing rubber 36, and engaging and coupling the bolt 36a and a nut.

As shown in FIG. 8, the floor 35 is formed in a stepped shape in a side elevational view, is structured as an upper surface partition wall covering an upper side of the engine (not shown) in a rear end portion side thereof, and is structured as a front surface partition wall covering a front surface side of the engine by a center portion. Further, the floor plate of the driver seat 6 is structured by a front portion of the floor 35. The front end portion of the floor 35 is rotatably supported to the rev-frame 25 by a hinge mechanism 38 formed with respect to the rev-frame 25, and the floor 35 can be tilted up via the hinge mechanism 38.

In order to assist the tilt-up of the floor 35, a torsion bar 40 is arranged in a lower surface of the floor 35, and energizes the floor 35 in a tilt-up direction. Moreover, in order to assist the tilt-up of the floor 35, a spring cylinder 39 is arranged between the lower surface of the floor 35 and the rev-frame 25. In place of using the spring cylinder 39, it is possible to use an assisting means utilizing an assist force of a gas pressure, a hydraulic pressure, a spring force, a feeding screw or the like.

A lock plate 41 in which long holes 43a having lock grooves 43b are formed in both ends is attached to the floor 35. Further, a lock bar 42 energized in a forward side of the main machine 14 is arranged in the rev-frame 25 in a state of being pressed and energized to the forward side within the long hole 43a.

It is possible to maintain the floor 35 in a tilt-up state by sliding the lock plate 41 to an upper side while an inner side of the long hole 43 is pressed by the lock bar 42, that is, tilting up the floor 35 so as to engage the lock bar 42 with the lower lock groove 43b.

Further, it is possible to maintain the floor 35 in a normal work state by detaching the lock bar 42 from the lower long hole 43a, and sliding the lock plate to the lower side while the inner side of the long hole 42a is pressed by the lock bar, that is, tilting down the floor 35 so as to engage the lock bar 42 with the upper lock groove 43b.

A canceling operation between the lock bar 42 and the lock groove 43b can be executed by canceling the pressure energization applied to the lock groove 43b of the lock bar 42 by the operation lever arranged in the floor 35, the armored cover or the like.

As shown in FIGS. 5 and 6, in order to tilt up the floor 35, it is necessary to cancel the fixed state between the first support column 15 of the mounting bracket 3 and the counter weight 2 by detaching the mounting bolt 21, and cancel the fixed state between the bracket 22 and the first mounting seat plate 16 by detaching the bolt 23. Further, it is possible to tilt up the floor 35 side by operating the operation lever (not shown) so as to cancel the lock bar 42 shown in FIG. 8 from the engaged state with the lock groove 43b.

When tilting up the floor 35, the torsion bar 40 and the spring cylinder 39 can assist the force for tilting up. In addition, when moving the floor 35 downward to the normal working state position from the tilt-up state, it is possible to assist a slow descent of the floor 35 at a safely descending speed without steep diving, by the torsion bar 40 and the sprig cylinder 39. In other words, it is possible to achieve a damper function by the torsion bar 40 and the spring cylinder 39.

When the floor 35 is tilted up, the rear hood 32 can be tilted up together with the floor 35, and it is possible to widely open the working space executing the maintenance and inspection work around the engine (not shown) or the maintenance and inspection work within the rev-frame in the state in which the floor 35 is tilted up. Since the rising object obstructing the maintenance and inspection work or the like is excluded around the engine or the like, it is possible to easily execute the maintenance and inspection work, and it is possible to easily execute the detachment of the engine or the like.

In the first embodiment, the description is given of the example in which the canopy 4 is detachably supported and fixed to the first mounting seat plate 16 of the mounting bracket 3. However, the structure may be made such that the canopy 4 is directly supported and fixed to the floor 35 detachably. Furthermore, the structure in which the canopy 4 is directly supported and fixed to the floor 35 detachably is included in the present invention.

Second Embodiment

Figure 9:
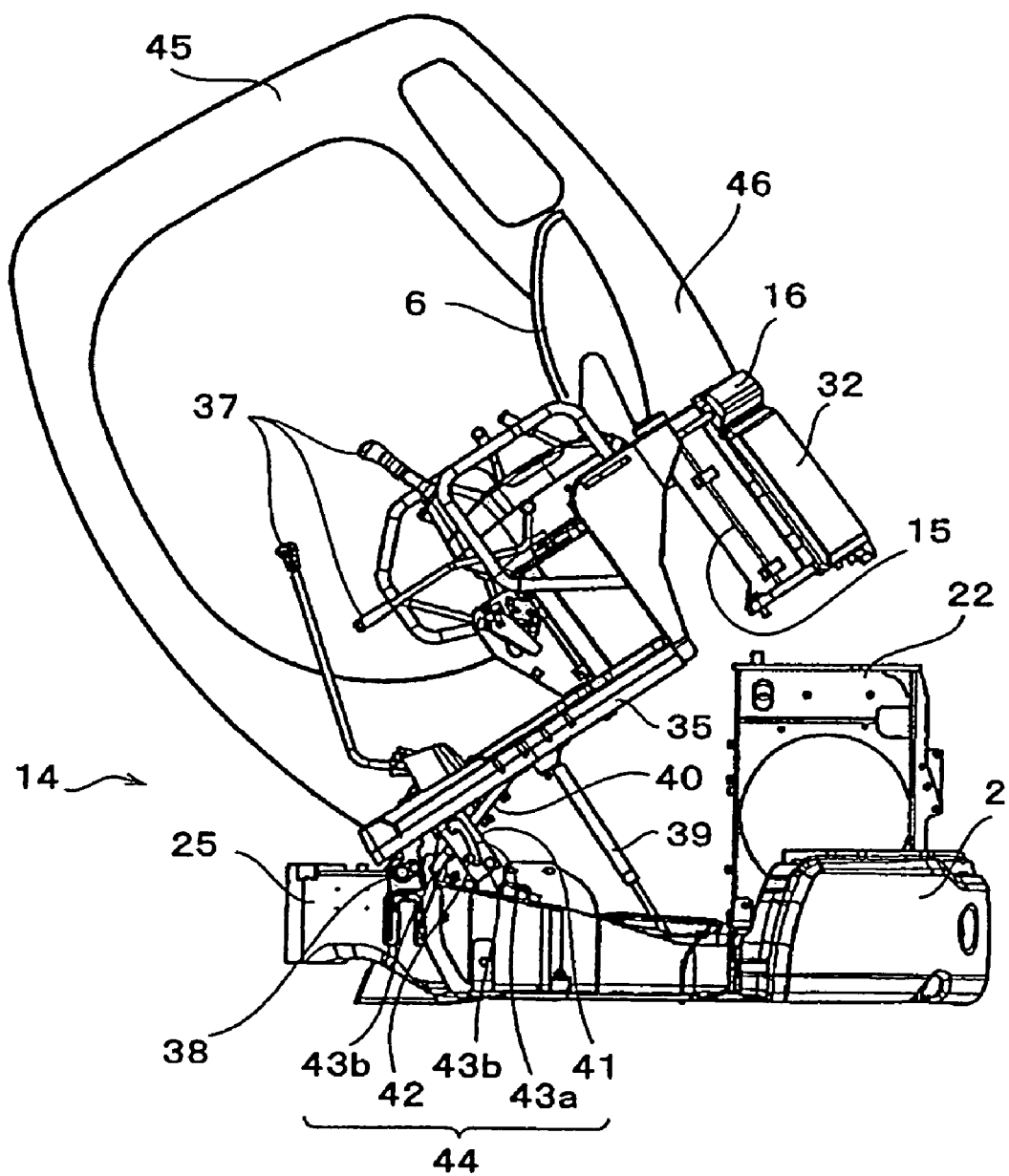
FIG. 9 It is a side elevational view showing a tilt-up state of a floor (second embodiment).
Figure 10:
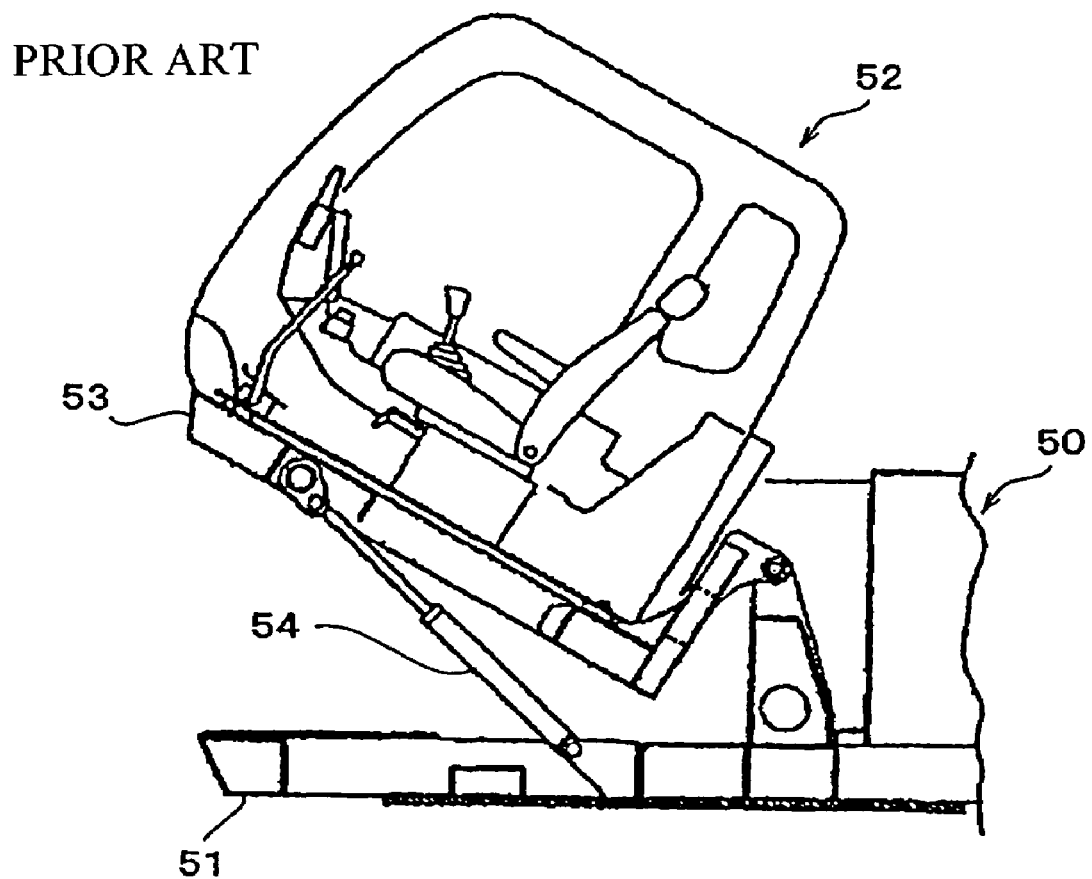
FIG. 10 It is a side elevational view showing a tilt-up state of a floor (conventional example 1).
Figure 11:
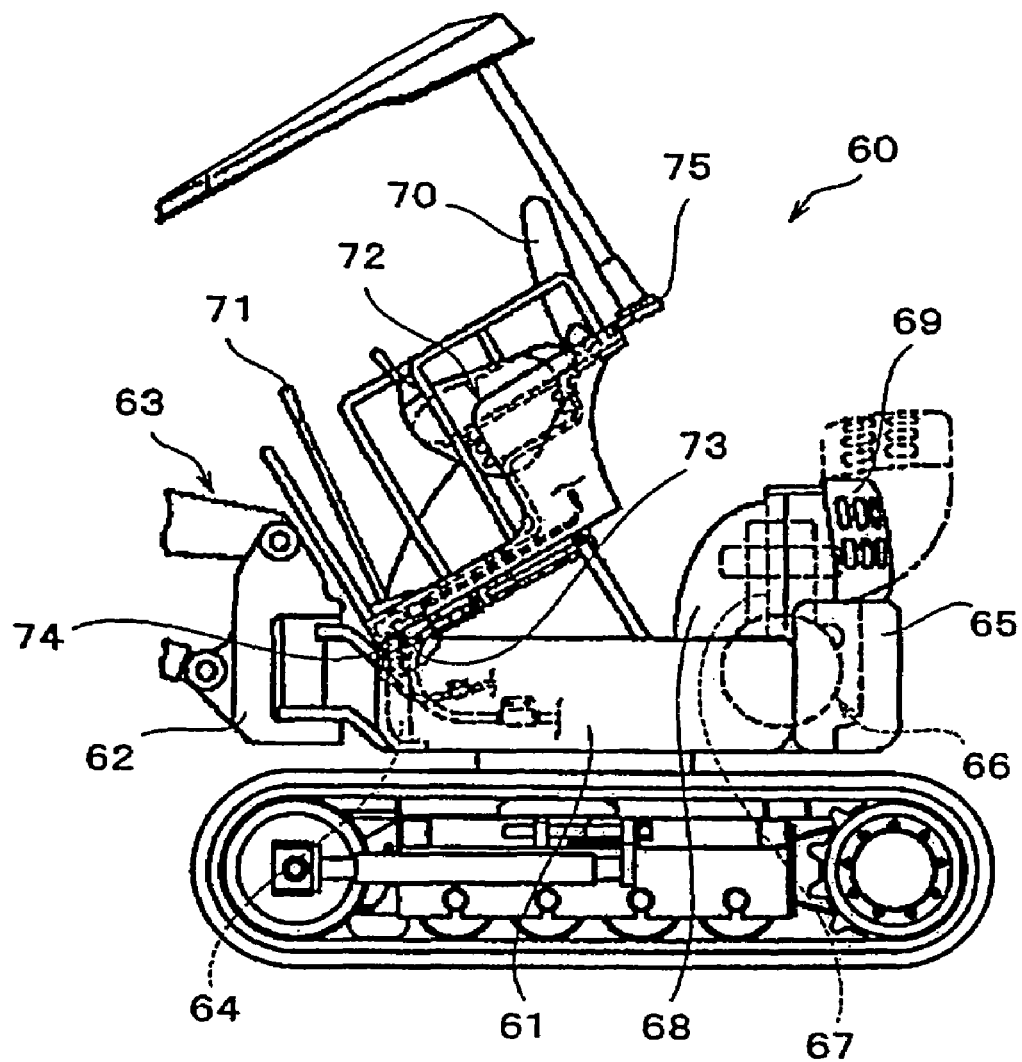
FIG. 11 It is a side elevational view showing a tilt-up state of a floor (prior art).

In FIG. 9, there is shown a view of structures of main portions of a second embodiment of the present invention. In the second embodiment, the same reference numerals as the reference numerals used in the first embodiment are used in the same structures as those of the first embodiment. A description of the same members as those of the first embodiment will be omitted by using the same reference numerals. Further, the same effects as those described in the first embodiment can be achieved in the second embodiment.

In the first embodiment, the description is given of the structure in which the canopy 4 can be tilted up together with the floor 35. However, in the second embodiment, the structure is made such that a cab 45 is arranged around the driver seat 6 in place of the canopy 4. The other structures employ the same structures as those in the first embodiment.

The cab 45 can be supported and fixed to the floor 35, and the structure may be made such that a rear end portion 46 of the cab 45 is supported and fixed to the first mounting seat plate 16 of the mounting bracket 3.

In the first and second embodiments mentioned above, there is shown the example in which the first support column 15 in the mounting bracket 3 is supported and fixed by the counter weight 2. However, the first support column 15 may be supported and fixed to the rev-frame 25 or the like in place of being supported and fixed to the counter weight 2.

Further, in the first and second embodiments, the description is given of the example in which the first mounting seat plate 16 is used. However, in the present invention, the structure may be made such that the second mounting seat plate of the canopy 4 is directly supported and fixed by the first support column 15, the bracket 22, the radiator bracket 26, the engine bracket, the armored bracket or the like, without using the first mounting seat plate.

INDUSTRIAL APPLICABILITY

In the present invention, it is possible to apply the technical idea of the present invention to the apparatuses or the like to which the technical idea of the present invention can be applied.

The invention claimed is:

1. A working vehicle in which a main machine having a working machine, a driver seat is mounted on a lower traveling body; and a counter weight balancing with the working machine is arranged in a rear portion of the main machine, comprising:
    a floor constituting a floor portion of the main machine is structured such that the floor can be tilted up; and
    a rear hood in the main machine is arranged such that the rear hood can be tilted up integrally with the floor when the floor is tilted up,
    wherein the working vehicle is provided with a mounting bracket detachably supported and fixed by constituting members of the working vehicle, and
    wherein the mounting bracket has a first mounting seat plate detachably supporting and fixing a rear end portion of the floor, and at least one first support column supporting and fixing a center in a lower surface side of the first mounting seat plate while opening; and the first support column or the first mounting seat plate attaches a hinge portion of an inspection door.

2. The working vehicle according to claim 1, wherein the rear hood is an openable and closable inspection door.

3. The working vehicle according to claim 1, wherein the working vehicle is provided with a cab or a canopy; and
    the cab or the canopy is arranged such that the cab or the canopy can be tilted up integrally with the floor when the floor is tilted up.

4. The working vehicle according to claim 2, wherein the working vehicle is provided with a cab or a canopy; and
    the cab or the canopy is arranged such that the cab or the canopy can be tilted up integrally with the floor when the floor is tilted up.

5. The working vehicle according to claim 1, wherein the inspection door is structured to open to an upper side of the first support column.

6. The working vehicle according to claim 1, wherein the inspection door is double hinged around a first side of the first support column having the first side and a second side.

7. The working vehicle according to claim 1, wherein the first support column is fixed to the counter weight.

8. The working vehicle according to claim 1, further comprising a vibration proofing member interposed between the first mounting seat plate and the floor.

9. The working vehicle according to claim 8, wherein the vibration proofing member is constructed from vibration proofing rubber.

10. The working vehicle according to claim 1, wherein the first support column is formed in one of the following cross-sections: an L-shape, a C-shape, a rectangle, and a triangle.

11. A method of constructing a working vehicle having a main machine, the method comprising;
    mounting a driver seat to a lower traveling body included in the main machine;
    arranging a counter weight in a rear portion of the main machine to balance the working machine;
    structuring a floor of the main machine such that the floor is tiltable;
    connecting a rear hood with the floor such that the rear hood tilts with the floor;
    providing a mounting bracket that is detachably supported and fixed by constituting members of the working vehicle, wherein the mounting bracket has a first mounting seat plate detachably supporting and fixing a rear end portion of the floor;
    providing at least one first support column that supports and fixes a center in a lower surface side of the first mounting seat while opening; and
    attaching a hinge portion of an inspection door to one of the first support column or the first mounting seat plate.

12. A working vehicle including a main machine comprising including:
    a working machine:
    a lower traveling body connected to the working machine;
    a driver seat mounted to the lower traveling body; and
    a counter weight balancing the working machine arranged in a rear portion;
    a floor of the main machine structured to tilt upward;
    a first mounting seat plate connected to a rear end portion of the floor detachably supporting and fixing a rear end portion of the floor;
    a mounting bracket detachably connected to the first mounting plate;
    a rear hood integrally coupled with the floor to tilt when the floor is tilted;
    a first support column supporting and fixing a center in a lower surface side of the first mounting seat plate while opening;
    an inspection door having a hinge portion attached to the first support column; and
    a second mounting seat plate supported and fixed to the first mounting seat plate.

13. The working vehicle of claim 12, wherein:
    the first mounting seat plate includes a first mounting hole;
    the second mounting seat plate includes a second mounting hole,
    wherein the second mounting plate is supported and fixed to the first mounting plate by a screw passing through the first mounting hole and the second mounting hole.

* * * * *